(12) United States Patent
Willberg et al.

(10) Patent No.: US 7,380,600 B2
(45) Date of Patent: Jun. 3, 2008

(54) DEGRADABLE MATERIAL ASSISTED DIVERSION OR ISOLATION

(75) Inventors: Dean Willberg, Moscow (RU); Marina Bulova, Moscow (RU); Christopher N. Fredd, Missouri City, TX (US); Alexey Vostrukhov, Nizhny (RU); Curtis L. Boney, Houston, TX (US); John Lassek, Katy, TX (US); Ann M. W. Hoefer, Houston, TX (US); Philip F. Sullivan, Bellaire, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 311 days.

(21) Appl. No.: 11/294,983

(22) Filed: Dec. 5, 2005

(65) Prior Publication Data

US 2006/0113077 A1    Jun. 1, 2006

Related U.S. Application Data

(63) Continuation-in-part of application No. 11/156,966, filed on Jun. 20, 2005, now Pat. No. 7,275,596, and a continuation-in-part of application No. 11/206,898, filed on Aug. 18, 2005.

(60) Provisional application No. 60/606,270, filed on Sep. 1, 2004.

(51) Int. Cl.
*E21B 33/138* (2006.01)
*E21B 43/267* (2006.01)

(52) U.S. Cl. ............ 166/280.1; 166/281; 166/282; 166/283; 166/294; 166/300; 166/308.2; 507/225; 507/260

(58) Field of Classification Search ............. 166/280.1, 166/281, 282, 283, 284, 294, 295, 300, 307, 166/308.2, 308.3; 507/225, 260, 924
See application file for complete search history.

(56) References Cited

U.S. PATENT DOCUMENTS

| | | | | |
|---|---|---|---|---|
| 3,974,077 | A | * | 8/1976 | Free ........................... 507/211 |
| 4,387,769 | A | * | 6/1983 | Erbstoesser et al. ......... 507/219 |
| 4,715,967 | A | * | 12/1987 | Bellis et al. ................ 507/219 |
| 4,716,964 | A | * | 1/1988 | Erbstoesser et al. ........ 166/284 |
| 4,986,355 | A | * | 1/1991 | Casad et al. ................ 166/295 |
| 5,990,051 | A | * | 11/1999 | Ischy et al. ................. 507/204 |

(Continued)

OTHER PUBLICATIONS

U.S. Appl. No. 10/214,817—*Methods and Fluid Compositions Designed to Cause Tip Screenouts.*

(Continued)

*Primary Examiner*—George Suchfield
(74) *Attorney, Agent, or Firm*—Darla Fonseca; David Cate; Robin Nava

(57) ABSTRACT

A method for well treatment by forming a temporary plug in a fracture, a perforation, a wellbore, or more than one of these locations, in a well penetrating a subterranean formation is provided, in which the method of well treatment includes: injecting a slurry comprising a degradable material, allowing the degradable material to form a plug in a perforation, a fracture, or a wellbore in a well penetrating a formation; performing a downhole operation; and allowing the degradable material to degrade after a selected time such that the plug disappears.

25 Claims, 8 Drawing Sheets

U.S. PATENT DOCUMENTS

| | | |
|---|---|---|
| 6,380,138 B1 * | 4/2002 | Ischy et al. ............... 507/204 |
| 6,599,863 B1 * | 7/2003 | Palmer et al. ............. 507/219 |
| 2003/0060374 A1 | 3/2003 | Cooke |
| 2003/0062160 A1 * | 4/2003 | Boney et al. ............... 166/278 |
| 2004/0261993 A1 | 12/2004 | Nguyen |
| 2005/0000690 A1 | 1/2005 | Boney |
| 2006/0021753 A1 * | 2/2006 | Wilkinson ............... 166/308.1 |
| 2006/0032633 A1 | 2/2006 | Nguyen ................... 166/280.2 |
| 2006/0118301 A1 * | 6/2006 | East et al. ............... 166/280.2 |
| 2006/0169453 A1 | 8/2006 | Savery |

OTHER PUBLICATIONS

U.S. Appl. No. 10/605,784—*Generating Acid Downhole in Acid Fracturing*.

U.S. Appl. No. 11/156,966—*Degradable Fiber Systems for Stimulation*.

U.S. Appl. No. 11/206,898—*Methods for Controlling Fluid Loss*.

\* cited by examiner

DEGRADABLE MATERIAL ASSISTED DIVERSION OR ISOLATION

BACKGROUND OF THE INVENTION

This application is a Continuation-in-Part of U.S. patent application Ser. No. 11/156,966, entitled "Degradable Fiber Systems For Stimulation," filed Jun. 20, 2005 now U.S. Pat. No. 7,275,596, hereby incorporated in its entirety. This application is also a Continuation-in-Part of U.S. patent application Ser. No. 11/206,898, entitled "Methods For Controlling Fluid Loss," filed Aug. 18, 2005, hereby incorporated in its entirety, which claimed the benefit of U.S. Provisional Application 60/606,270, filed Sep. 1, 2004. The invention relates to stimulation of wells penetrating subterranean formations. More particularly, it relates to fracturing and post-job protection of hydraulic fractures.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated," for example using hydraulic fracturing, chemical (usually acid) stimulation, or a combination of the two (called acid fracturing or fracture acidizing).

Hydraulic fracturing involves injecting fluids into a formation at high pressures and rates such that the reservoir rock fails and forms a fracture (or fracture network). Proppants are typically injected in fracturing fluids after the pad to hold the fracture(s) open after the pressures are released. In chemical (acid) stimulation treatments, flow capacity is improved by dissolving materials in the formation.

In hydraulic and acid fracturing, a first, viscous fluid called a "pad" is typically injected into the formation to initiate and propagate the fracture. This is followed by a second fluid that contains a proppant to keep the fracture open after the pumping pressure is released. Granular proppant materials may include sand, ceramic beads, or other materials. In "acid" fracturing, the second fluid contains an acid or other chemical such as a chelating agent that can dissolve part of the rock, causing irregular etching of the fracture face and removal of some of the mineral matter, resulting in the fracture not completely closing when the pumping is stopped. Occasionally, hydraulic fracturing is done without a highly viscosified fluid (i.e., slick water) to minimize the damage caused by polymers or the cost of other viscosifiers.

When multiple hydrocarbon-bearing zones are stimulated by hydraulic fracturing or chemical stimulation, it is desirable to treat the multiple zones in multiple stages. In multiple zone fracturing, a first pay zone is fractured. Then, the fracturing fluid is diverted to the next stage to fracture the next pay zone. The process is repeated until all pay zones are fractured. Alternatively, several pay zones may be fractured at one time, if they are closely located with similar properties. Diversion may be achieved with various means. The commonly used methods for stress/pressure diversion in multiple fracturing stages are as follows.

The first method is the Bridge Plug technique. For example, the operator perforates, then fractures, then sets a bridge plug, and then repeats this process as necessary. This approach ensures 100% positive zone isolation by setting a packer between fractured and targeted zones. However, this approach is extremely costly. The costs come from extensive wireline service intervention, which requires additional time to perforate and to set and then retrieve the packer from the wellbore for each pay zone before and after a fracturing treatment. In addition, packer retrieval is sometimes risky.

The second method is the Flow Through Composite Bridge Plug (FTCBP) approach, which is a modification of the Bridge Plug. FTCBP works as a Bridge Plug when there is higher pressure above it, such as during subsequent fracturing treatment. However, when the pressure is higher below the plug, such as when flowing the well back, the FTCBP lets fluid flow from below through the plug. Use of the FTCBP technique allows all preceding fractured zones to flow during completion of the well. This method has two advantages. First, it considerably reduces the shut-in time by flowing each fracture back early. Second, all previously treated zones help to clean up each new treatment. After a well is completed, the FTCBP can be drilled out easily or can be left in the well. This technique has proven to be a reliable tool that increases production. The main disadvantage is the cost and time needed to set the plug.

The third approach is the Sand Plugs technique. This is similar to the Bridge Plug techniques except that sand plugs are used instead of tools. The main idea is to fracture several pay zones sequentially via different perforation sets and set a sand plug at the end of each treatment stage to prevent flow beyond the plug, and thus divert the stress field for successive stages. This method substantially reduces time and costs because it requires no packer retrieval. However, due to initial in-situ stress variations, not all zones may be fractured. Furthermore, the proppant placement requires loading the wellbore with proppant, which may result in low efficiency of the treatment.

The fourth method is the Limited Entry approach, which is a simplified technique that does not require loading the wellbore with sand. This makes the method more affordable. The method is used, for example, in combination with ball sealers to plug the stages, or by having differing numbers of perforations for the different stages. The limited entry method basically relies on creating an artificial pressure drop across a calculated number of perforations. From the number of perforations, the size of the perforations, and the injection rate, the pressure drop is calculated. This pressure differential is then adjusted through the number of perforations to create a designated pressure on the formation side of the perforations equal to the fracturing pressure. Knowing the exact fracturing pressure of each sand layer is an essential portion of the limited entry technique. In an infill-drilling program within a stratigraphic pay, the pressure of any given sand can vary considerably. Acquiring reliable pressure data involves testing each zone, adding time and cost to the completion. Without knowing the exact data, a treatment may result in little or no production from some sets of perforations.

Ball sealers usually comprise small rubber-coated balls suspended in the treating fluid and pumped into the well along with the treating fluid. The balls are carried down to the perforations communicating with the high permeability formation zone. The ball sealers seat on these perforations and divert the treating fluid to a formation zone having a lower permeability. In some cases, the presence of such ball sealers in the wellbore after the treatment presents operational problems during their retrieval. Use of degradable balls can help eliminate these problems, as reported in U.S. Pat. No. 6,380,138 issued to Ischy et al. Balls made of polyester polymer degrade with time, forming soluble oligomers and allowing perforations to re-open.

The fifth method is the Induced Stress Diversion Technique. This is simply an application of staged hydraulic fracturing treatments without the use of any positive isolation, such as bridge plugs, frac baffles, sand plugs, or ball sealers. The ISD technique combines the advantages of the Limited Entry and multi-staged fracturing techniques. The technique involves pumping multiple fracs in a well and relying on the induced stress imparted by an earlier fracture stimulation to divert the subsequent fracture to the desired zone without positive zonal isolation. In this approach, the induced stress resulting from hydraulic fracturing of preceding stages functions as input energy to effectively divert the fracs to successive stages. The ISD procedure may be used to perforate and fracture multiple, discrete pay intervals by repeating the process as many times as needed (see FIG. 1). Some ISD techniques may include methods to induce screenouts to help with the diversion.

However, ISDT requires good knowledge of reservoir properties. This makes ISDT not easily repeatable in areas with varying properties. In order to achieve maximum stress diversion, an optimized fracturing treatment is required based on mechanical properties of the formation. This often necessitates acquiring data using a design tool, such as a DataFRAC™ (Trade name of Schlumberger Technology Corp.), and successive redesigns of the approach. This takes time. In addition, redesign is strongly dependent on critical assumptions about formation properties. As a result, currently there is no reliable methodology to justify the use of ISDT in tight gas reservoirs. Therefore, there still exists a need for easy and reliable methods for diversion, multi-stage fracturing, or temporary sealing in the downhole environment.

SUMMARY OF EMBODIMENTS OF THE INVENTION

A method for well treatment by forming a temporary plug in a fracture, a perforation, or a wellbore (or more than one of these locations) penetrating a subterranean formation is provided. A method of well treatment in accordance with one embodiment of the invention includes: injecting a slurry comprising a degradable material, allowing the degradable material to form a plug in a perforation, a fracture, or a wellbore penetrating a formation; performing a downhole operation; and allowing the degradable material to at least partially degrade after a selected duration such that the plug disappears. The degradable materials may be a polymer or co-polymer of esters, amides, or other materials. The degradable material degrades after a selected duration under the downhole conditions such that no additional intervention is needed to remove the plug.

The temporary blockage by plug formation allows other well operations to be performed without damaging the existing fracture or without interference from the existing fracture. Such other well operations may include fracturing other zones, well repair, or installation of downhole equipment. As an example, a formation layer is fractured, the treatment of the invention is performed, and another layer is fracture. These steps may then be repeated again. Preferably, no sand plug, bridge plug, or any isolation device is used. Preferably any undegraded material is produced with produced fluid without any need to assist in its removal. The treatment may be done such that the wellbore between the plug and the wellhead is filled with fluid and the hydrostatic pressure on the wellbore side of the plug is greater than on the other side of the plug.

In other embodiments the slurry contains other particulates (such as proppants) or absorbents. Furthermore, other additives may be added to increase or decrease the degradation rates of the degradable materials. Modeling techniques known in the art may be used with embodiments of the invention to optimize the parameters for the well treatment. For example, modeling may be used to determine the duration needed for the operation to be performed, and the degradable material, its concentration, and pumping rate are then selected accordingly. The main limitation of ISD is that the induced stress field is limited in the amount of stress it can create, typically in the range of 500 psi (3.44 MPa) or so. If the zones' fracture pressures are greater than about 500 psi (3.44 MPa), the differential stress created will not be enough to prevent the original fracture from taking subsequent injections.

Other aspects and advantages of the invention will become evident from the following description and the accompanying claims.

BRIEF DESCRIPTION OF THE DRAWINGS

FIG. 10 shows a schematic illustrating plugging of a wellbore by using a degradable material and other materials (such as sand) in accordance with one embodiment of the invention.

DETAILED DESCRIPTION OF EMBODIMENTS OF THE INVENTION

Figure 1:
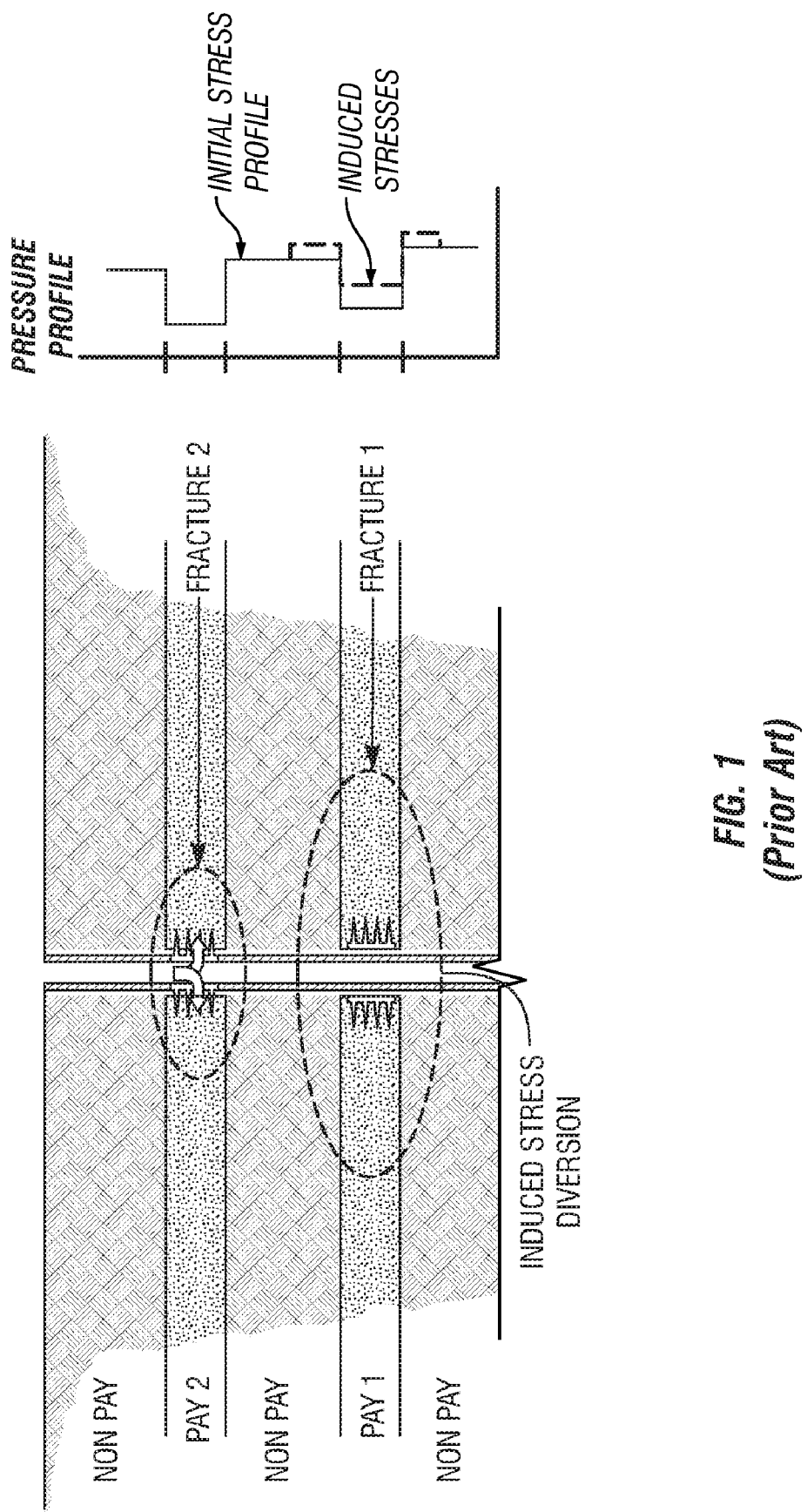
FIG. 1 shows a schematic illustrating an induced stress diversion technique as used in the prior art.

Embodiments of the invention relate to methods for temporarily blocking wellbores, perforations, or formation fractures so that other work (e.g., fracturing of other zones, workover, well repair, installation of downhole equipment, etc.) can be performed more efficiently or without damaging existing fractures. The temporary blocking is achieved by using degradable materials that will degrade within a desired period of time. As applied in fracturing, the techniques of the invention are similar to the ISDT's that are currently used on U.S. land.

Degradable materials have been used for fluid loss control and for diversion in the past. Examples include rock salt, graded rock salt, benzoic acid flakes, wax beads, wax buttons, oil-soluble resin material, etc. However, these materials have been used in sizes and shapes designed to build filter cakes on wellbore or fracture faces; they have not been used to plug wellbores, perforations, or fractures.

Various degradable materials are used with embodiments of the invention. Such materials include inorganic fibers, for example of limestone or glass, but are more commonly polymers or co-polymers of esters, amides, or other similar materials. They may be partially hydrolyzed at non-backbone locations. Examples include polyhdroxyalkanoates, polyamides, polycaprolactones, polyhydroxybutyrates, polyethyleneterephthalates, polyvinyl alcohols, polyvinyl acetate, partially hydrolyzed polyvinyl acetate, and copolymers of these materials. Polymers or co-polymers of esters, for example, include substituted and unsubstituted lactide, glycolide, polylactic acid, and polyglycolic acid. Polymers or co-polymers of amides, for example, may include polyacrylamides. Materials that dissolve at the appropriate time under the encountered conditions are also used, for example polyols containing three or more hydroxyl groups. Polyols useful in the present invention are polymeric polyols solubilizable upon heating, desalination or a combination thereof, and consist essentially of hydroxyl-substituted carbon atoms in a polymer chain spaced from adjacent hydroxyl-substituted carbon atoms by at least one carbon atom in the polymer chain. In other words, the useful polyols are preferably essentially free of adjacent hydroxyl substituents. In one embodiment, the polyols have a weight average molecular weight greater than 5000 up to 500,000 or more, and from 10,000 to 200,000 in another embodiment. The polyols may if desired be hydrophobically modified to further inhibit or delay solubilization, e.g. by including hydrocarbyl substituents such as alkyl, aryl, alkaryl or aralkyl moieties and/or side chains having from 2 to 30 carbon atoms. The polyols may also be modified to include carboxylic acid, thiol, paraffin, silane, sulfuric acid, acetoacetylate, polyethylene oxide, quaternary amine, or cationic monomers. In one embodiment, the polyol is a substituted or unsubstituted polyvinyl alcohol that can be prepared by at least partial hydrolysis of a precursor polyvinyl material with ester substituents. Although it is normally not necessary, the degradation may be assisted or accelerated by a wash containing an appropriate dissolver or that changes the pH or salinity. The degradation may also be assisted by an increase in temperature, for example when the treatment is performed before steamflooding. Below, when we use the term degradable, we include all of these suitably dissolvable materials.

These materials are typically used at high concentrations (e.g., >60 lbm/1,000 gal (>7.2 g/L)) in order to form temporary plugs or bridges. The concentrations can be lower if the fiber slurry can lose water, which concentrates the fibers. The maximum concentrations of these materials that can be used may be limited by the surface addition and blending equipment available.

These degradable or dissolvable materials may be in any shape: for example, powder, particulates, beads, chips, or fibers. Preferred embodiments may use these materials in the form of fibers. The fibers may have a length of about 2 to about 25 mm, preferably about 3 to about 18 mm. Typically, the fibers have a denier of about 0.1 to about 20, preferably about 0.15 to about 6. The fibers preferably degrade under downhole conditions in a duration that is suitable for the selected operation.

While methods of the invention may be used in fracturing, workover, or other types of operations, for clarity, the following description will use hydraulic fracturing as an example to illustrate embodiments of the invention. It will also be assumed, as an example, that sequential fracturing starts at the bottom of a vertical well, or the distal end of a horizontal well, and progresses towards the wellhead. Of course, other sequences are possible, depending upon the stress profile. One of ordinary skill in the art would appreciate that this is not intended to limit the scope of the invention to hydraulic fracturing. Instead, methods of the invention may also be used in other operations, such as temporary plugging of fractures or wellbores.

Some embodiments of the invention relate to temporarily blocking of already-created fractures so that other zones may be fractured. As applied to multi-stage fracturing, at the tail end of a fracturing treatment, a degradable or dissolvable material is pumped to temporarily plug a completed fracture. The temporary plug locks the proppants in a fracture, making them immobile and causing substantial stress increase and diversion in lower zones by means of a significant net pressure increase due to the high likelihood of proppant bridging with the degradable materials. In accordance with an alternative method of the invention, a degradable material that can create a temporary packer is pumped after the proppant stages to temporarily seal the fracture by sealing the perforations. In another alternative, the plug is formed in the wellbore to seal the perforations leading to the fracture. In yet another embodiment, a plug is formed in more than one of these locations. With this system, the fracture is protected and successive fracturing treatments, usually further up the hole, can be performed without the need for wireline intervention. The degradable material will dissolve with time and unplug the fracture. The degradable material may be of various properties, shapes and contents. The material decay or disintegration may be chemically, temperature or mechanically driven. These methods may be performed with any suitable equipment known in the art, including coiled tubing (CT) that has been installed in the wells for jetting new perforations. These methods of the invention are similar to the ISDT's that are currently used on the U.S. land. However, the degradable material assisted diversion (DMAD), in accordance with embodiments of the invention, can provide much higher and more reliable stress diversion.

Degradable materials have been used in other downhole operations, such as disclosed in U.S. patent application Ser. No. 11/156,966 filed on Jun. 20, 2005, by Willberg et al., entitled "Degradable Fiber Systems for Stimulation." This application is assigned to the assignee of the present invention and is incorporated by reference in its entirety. The degradable materials that may be used in accordance with embodiments of the invention can be comprised of various chemical compositions as long as they can degrade within the desired time period under the downhole conditions, which may include temperatures as high as 350° F. (about 180° C.) or more and pressures as high as 20,000 psi (137.9 MPa) or more. As noted above, some embodiments of the invention relate to degradable material assisted diversion and other embodiments relate to sealing of existing fractures, perforations, or wellbores. The following will describe the desired properties of the degradable materials in accordance with these purposes: as stress diversion agents or as sealers of perforations, fractures, or wellbores.

Degradable Materials as Diversion Agents

In stress diversion multi-stage fracturing, the stress should exceed the breakdown pressure and the net pressure increase during the subsequent stages. Stress or pressure for diversion to subsequent fracturing stages may result from at least four mechanisms: (1) normal increases in stress with depth; (2) pipe friction; (3) temporary supercharge from fracturing (net pressure); and (4) increased stress on proppants. Each of these factors will be analyzed in detail. (Another mechanism of stress diversion that naturally occurs in any job using polymer as the viscosifier is concentration of the polymer gel due to fluid loss, but this will not be discussed further.)

In-situ formation stress may arise from overburden stress, thermal stress, and tectonic strains. The common estimate for fracture pressure increase is 0.62 psi/ft (14 kPa/m). This suggests that identical rocks with normal pressure gradient have 620 psi (4.27 MPa) of diverting power per 1000 ft (304.8 m) of separation. However, in reality, fracture pressure distribution is not homogeneous (it is usually a function of the lithology and of the pore pressure of the layers in question) and does not vary linearly with depth. Therefore, additional energy often needs to be added to the system in order to ensure that the ISD technique would work consistently.

Pipe friction decreases the bottomhole pressure with depth. This has a positive effect on the Stress Diversion. However, even at high flow rates (hence, high friction), the friction pressure normally does not exceed 1000 psi/1000 ft (22.6 kPa/m). (In practice, the friction pressure diversion at best (e.g., for very viscous fluids) will not be higher than 1000 psi per 1000 ft. (6.90 MPa per 304.8 m)) A recent trend is to use low polymer loading for fracturing fluids. Such fracturing fluids will have low viscosity, and hence, lower friction pressure. As a result, friction pressure would not play an important role in a typical fracturing job using the ISD techniques. (With the limited entry technique, the limited number of perforations creates an artificial friction pressure, not due to the fluid, but rather due to the limited number of perforations.)

Fracturing supercharge comes from the need to overcome the breakdown pressure to initiate the fracturing process. Breakdown pressures are typically 5-10% higher than the fracture extension pressure, which is about the same as the closure stress. Typical values for fracture differential gradients are 0.1-0.2 psi/ft (2.26-4.53 kPa/m) at a depth around 10,000 ft (3048 m). This implies that it is worthwhile to have considerable excess net pressure in the first (lower) fracture to overcome the breakdown pressure of the upper zone. However, to be useful, the supercharge pressure in the first fracture should not be released via flowback.

Figure 2:
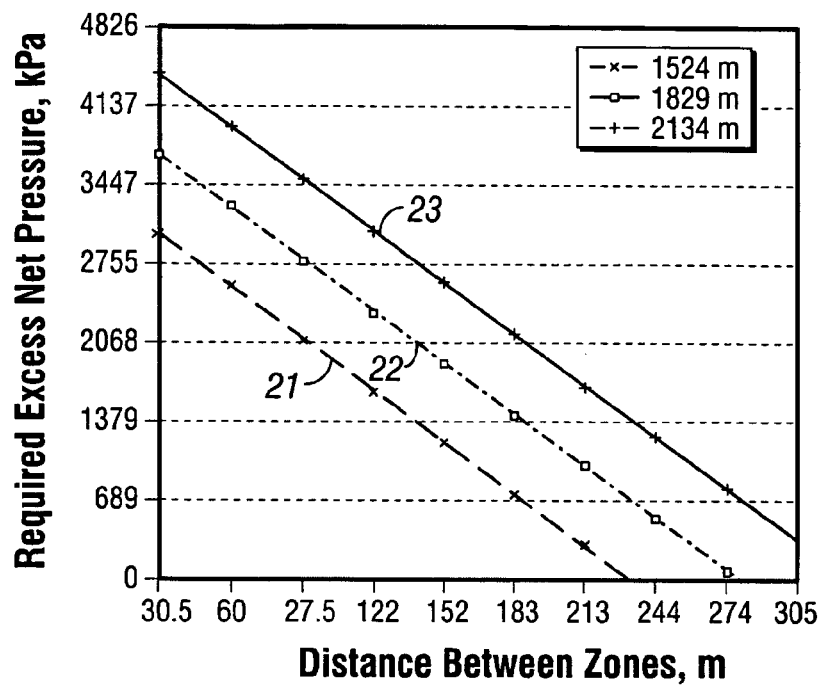
FIG. 2 shows a chart illustrating excess pressure needed to fracture a pay zone as a function of depth and spacing between pay zones.

FIG. 2 shows a chart of excess pressures typically required to fracture a formation at different depths (curve 21 for 5000 ft (1524 m); curve 22 for 6000 ft (1829 m); and curve 23 for 7000 ft (2134 m)). In this chart, it is assumed that the fracture gradient is 0.65 psi/ft (14.7 kPa/m), whereas the breakdown pressure gradient is 0.75 psi/ft (17 kPa/m). It is evident from FIG. 2 that the deeper the pay zones are, the higher the required excess pressures are for a given spacing between pay sands. For instance, if the first fracture was generated at 7500 ft (2286 m) and the next at 7000 ft (2134 m), the required excess pressure in the first fracture is approximately 370 psi (2551 kPa) (see curve 23). In tight gas formations, the required excess pressure may be as high as 2,000 psi (13.8 MPa) at depths higher than 10,000 ft (3048 m). These data all assume identical lithology and pore pressures. Variations in each of these could affect the curves.

When pumping stops after fracturing, the fractures will close on the proppant that has entered the fractures. Common industry practice for estimating closure stress on proppant is to subtract flowing bottomhole pressure from, the estimated in-situ stress of the pay interval fractured. However, is has been shown that closure stress on proppant can be significantly higher than expected due to the influence of the bounding layers. See Schubarth et al., "*Understanding Proppant Closure Stress,*" SPE 37489, SPE Production Operations Symposium, Oklahoma City, Okla., U.S.A., Mar. 9-11, 1997. Normally, a fracture does not propagate within the targeted sand bordering the lower and upper shales where the closure stress is higher. The stress differential between sand in the pay zone and sand at the boundaries may vary between 500 and 2500 psi (3.44 and 17.2 MPa). The thickness of a pay interval can vary from 20 to 200 ft (6.1 to 61 m). Based on these values, it has been shown that the excess closure pressure can vary from 300 psi (2.1 MPa) for a 200 ft (61 m) thick pay sand to 1500 psi (10.34 MPa) for a 20 ft (6.1 m) thick pay sand, assuming 1500 psi (10.34 MPa) in-situ pressure differential at the sand-shale boundaries (see FIG. 3). The excess stress at the sand-shale boundaries may have a negative effect on the fracture conductivity, but it has a positive effect on stress diversion. It should be noted that this mechanism is largely independent of mechanisms 1-3 of the four mechanisms listed above, because fracture closure does not occur until the fracture supercharge has completely dissipated through leak-off or flowback. Therefore, this mechanism can be considered separate from the other three mechanisms.

The interplay between the first three diversion mechanisms may be understood better by analyzing them in formulas. First, let's assume that:

the first pay sand is fractured and has a temporary supercharge of $\Delta_1$ psi;

the supercharge $\Delta_1$ is sufficient to divert the second stage;

there is a normal stress increase with depth of 0.65 psi/ft (14.7 kPa/m); and the friction pressure of the fracturing fluid is 500 psi/1000 ft (11.3 kPa/m).

With these assumptions, the governing equations can be written as:

For the first zone:

$$p_S + p_{HS1} - p_{fr1} \leq \sigma_{min1} + \Delta_1 \quad (1)$$

For the second zone:

$$p_S + p_{HS2} - p_{fr2} - \sigma_{min2} = \Delta_2 \quad (2)$$

where $p_S$ is the surface pressure, $p_{HSi}$ is the hydrostatic pressure for the i th-zone, $p_{fri}$ is the i th friction pressure, $\sigma_{mini}$ is the i th in-situ stress, and $\Delta_2$ is the net pressure in the second zone.

If one substitutes Eq. (2) into (1), one obtains:

$$\Delta_2 - p_{HS2} + p_{fr2} + \sigma_{min2} + p_{HS1} - p_{fr1} \leq \sigma_{min1} + \Delta_1 \quad (3)$$

or $$\Delta_2 + \Delta p_{HS} \leq \Delta_1 + \Delta p_{fr} + \Delta \sigma_{min} \quad (4)$$

where $\Delta p$ denotes $p_1 - p_2$. The right-hand side of inequality (4) describes the positive isolation mechanisms or induced stresses, while the left-hand part is the required excess pressure. With the assumptions listed above, $\Delta p_{HS} = 50$ psi/100 ft (11.3 kPa/m), $\Delta p_{fr} = 50$ psi/100 ft (11.3 kPa/m)., and $\Delta\sigma_{min}$=65 psi/100 ft (14,7 kPa/m). Substituting these numbers into inequality (4), one obtains for a spacing of 500 ft (152.4 m):

$$\Delta_1\Delta_2 - 325 \text{ psi (2.24 kPa)} \quad (5)$$

Inequality (5) indicates that if the net pressure in the first fracture is fully released (due to flowback or leak-off), then there is an excessive pressure of 325 psi (2.24 kPa) to divert the next stage. In low permeable hard rocks, a typical value for the net pressure may vary between 1000 and 2000 psi (6.9 and 13.8 MPa). This means that the ISD margin of safety may easily be exceeded in the case of first stage flowback.

The above description illustrates that while ISD techniques may provide effective diversion in certain formations, these techniques may not work in other formations. Unfortunately, short of measuring the in-situ stress of every pay zone to be fractured, there is no reliable way to predict which formations are suitable for ISD techniques. Embodiments of the invention provide more reliable diversion methods by adding degradable materials to enhance the net stress of the pay zone that was just fractured.

In accordance with embodiments of the invention, to achieve a greater net pressure in the first fracture, high concentrations of special degradable materials are used at the tail ends of fracturing treatments. The degradable materials may be fibers, powders, or any other forms. Laboratory and field experiments have shown that at high concentrations of fibers, the proppant-fiber slurry may bridge. As a result, the job may screen out. This will lead to a significant increase in the net pressure and to good near-wellbore proppant placement. Such a procedure may be called a "tail screenout." Studies have also shown that fiber bridging is a complicated phenomenon, which requires special modeling to design such a job properly. U.S. patent application Ser. No. 10/214,817 filed on Aug. 8, 2002, by Boney et al. discloses methods and compositions designed to cause tip screenouts. This application is assigned to the assignee of the present invention and is incorporated by reference in its entirety.

Figure 3:
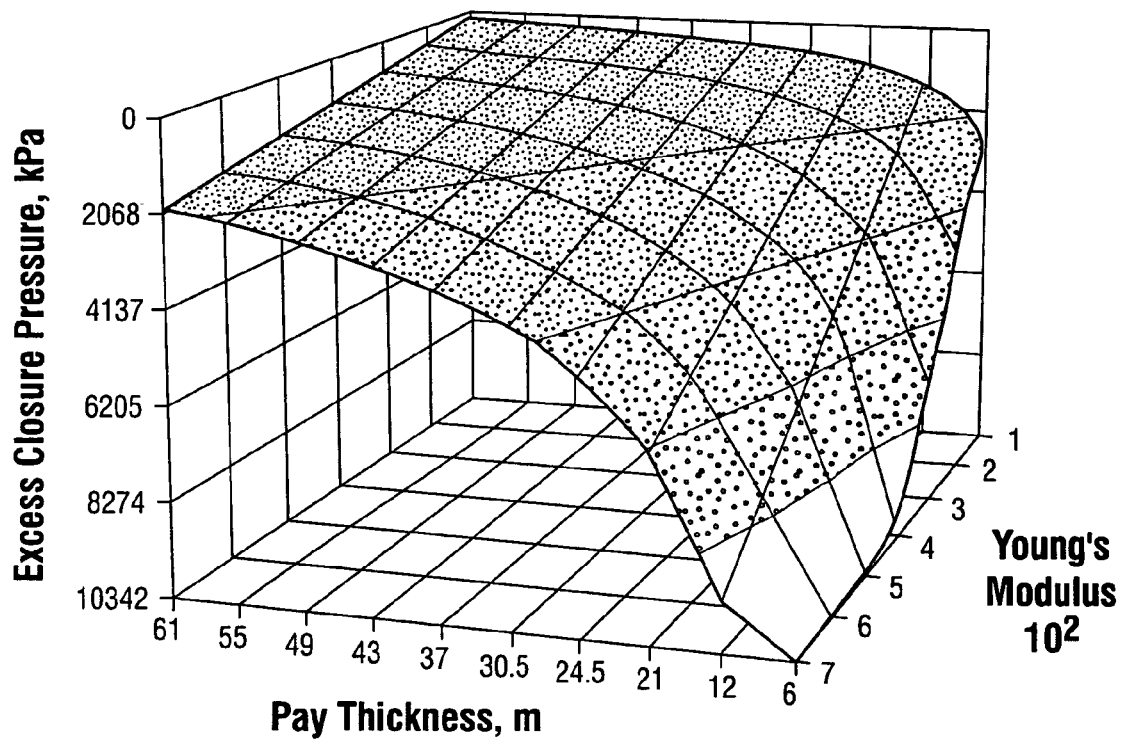
FIG. 3 shows a graph illustrating excess pressure for 1500 psi (10.34 MPa) in-situ stress differential between pay zone and shale.

On the other hand, if the first fracture supercharge is gone (e.g., due to leak-off or flowback), the fourth mechanism of those listed above (i.e., the incremental stress on proppants) is activated. FIG. 3 shows that the incremental stress on proppants may successfully substitute for the surcharge pressures described above, if one fractures several thin pay zones simultaneously in the first stage of fracturing.

The above description shows that in tight gas formations, there are two options to ensure sufficient stress for diversion: (a) maintain high net surcharge pressure in the first pay sand, i.e. prevent or minimize flowback; or (b) rely on the high incremental stress on proppant, i.e. immediate flowback after the first stage. The second option (relying on incremental stress on proppants) would be advantageous, if one fractures several thin pay zones with considerable in-situ stress differential between sands and shales.

The above description also shows that high degradable material concentrations at the tail end of a treatment may be used to: (a) sustain proppants, (i.e. to reduce settling rate during and after treatments and to reduce proppant flowback); and (b) ensure larger net surcharge pressure in the preceding stages.

Furthermore, the above description also shows that appropriate designing and laboratory experiments are desirable to ensure that the degradable material assisted diversion (DMAD) techniques in accordance with embodiments of the invention work properly. In addition to design and laboratory experiments, modeling may also be used to design proper parameters for the degradable material assisted diversion. Various modeling techniques are known in the art for designing various jobs in downhole environments, such as well stimulation, completion, etc. One of ordinary skill in the art would appreciate that any of such modeling techniques may be used with the DMAD techniques of the invention.

Degradable Materials as Sealers

Some embodiments of the invention relate to the use of degradable materials as sealers to temporarily block perforations, fractures, or wellbores such that other operations may be performed without interference from or damage to the existing fractures. When the degradable materials are used as sealers of wellbores, perforations, or fractures, all of the above-described mechanisms for diversion are also applicable. In addition, high concentrations (e.g., >60 lbm/1,000 gal (>7.2 g/L)) of a degradable material, for example in fiber form, may be pumped after the proppant stages to temporarily seal the wellbore, perforations, or fractures with fiber networks and to divert the subsequent stages.

Figure 4:
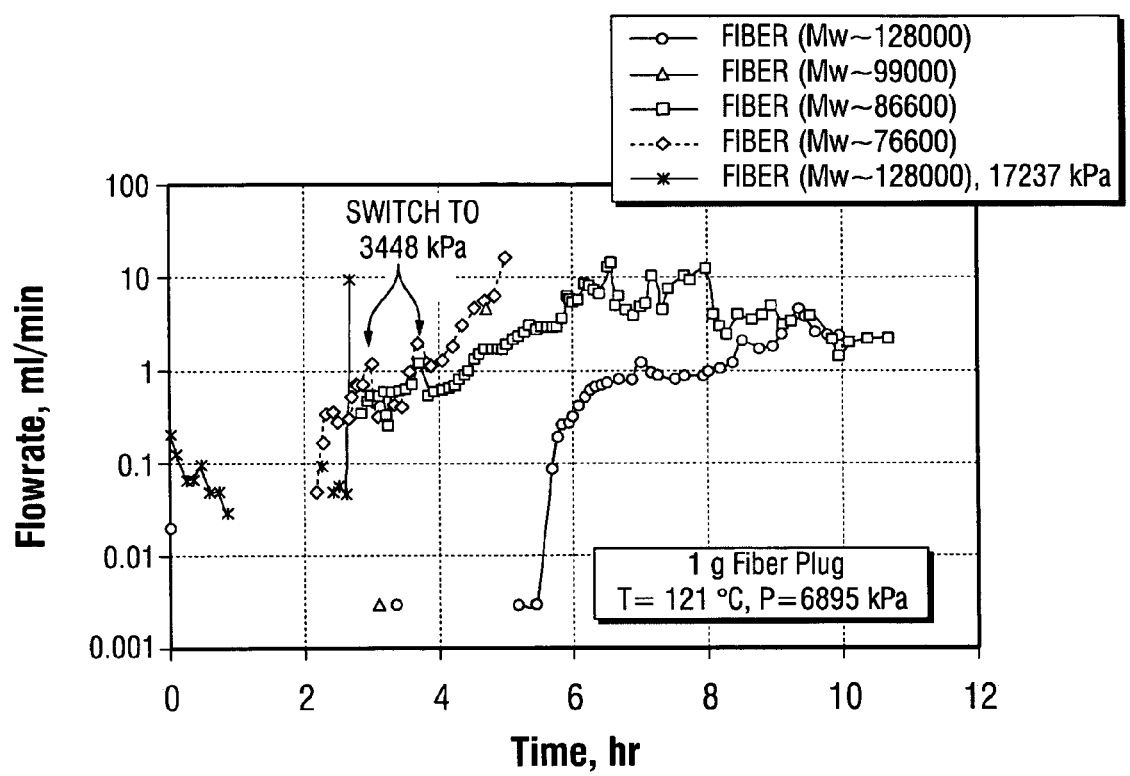
FIG. 4 shows a chart illustrating the decomposition of plugs made of polylactic acid fibers having different molecular weights (as evidenced by a rapid increase of flow through the plugs) at 250° F. (121° C.) and at 1000 and 2500 psi (6.89 and 17.24 MPa), in accordance with one embodiment of the invention.

A number of laboratory experiments on the generation and testing of fiber plugs have been performed. The testing showed that plugs of 1 cm diameter and 2 cm long can withstand 2500 psi (17.2 MPa) of pressure for 2-4 hours at 250° F. (121° C.), depending on the plug composition. FIG. 4 shows lifetimes of fiber plugs made of polylactic acids (PLA) having different molecular weights. As shown in FIG. 4, the higher molecular weight fiber plugs have longer lifetimes under the testing conditions (250° F. (121° C.); 1000 psi (6.9 MPa)). For example, the plug having a polymer with a molecular weight of 77,600 has a lifetime of several hours, while plugs made of higher molecular weight polymers have longer lifetimes (up to 6 hours).

Figure 5:
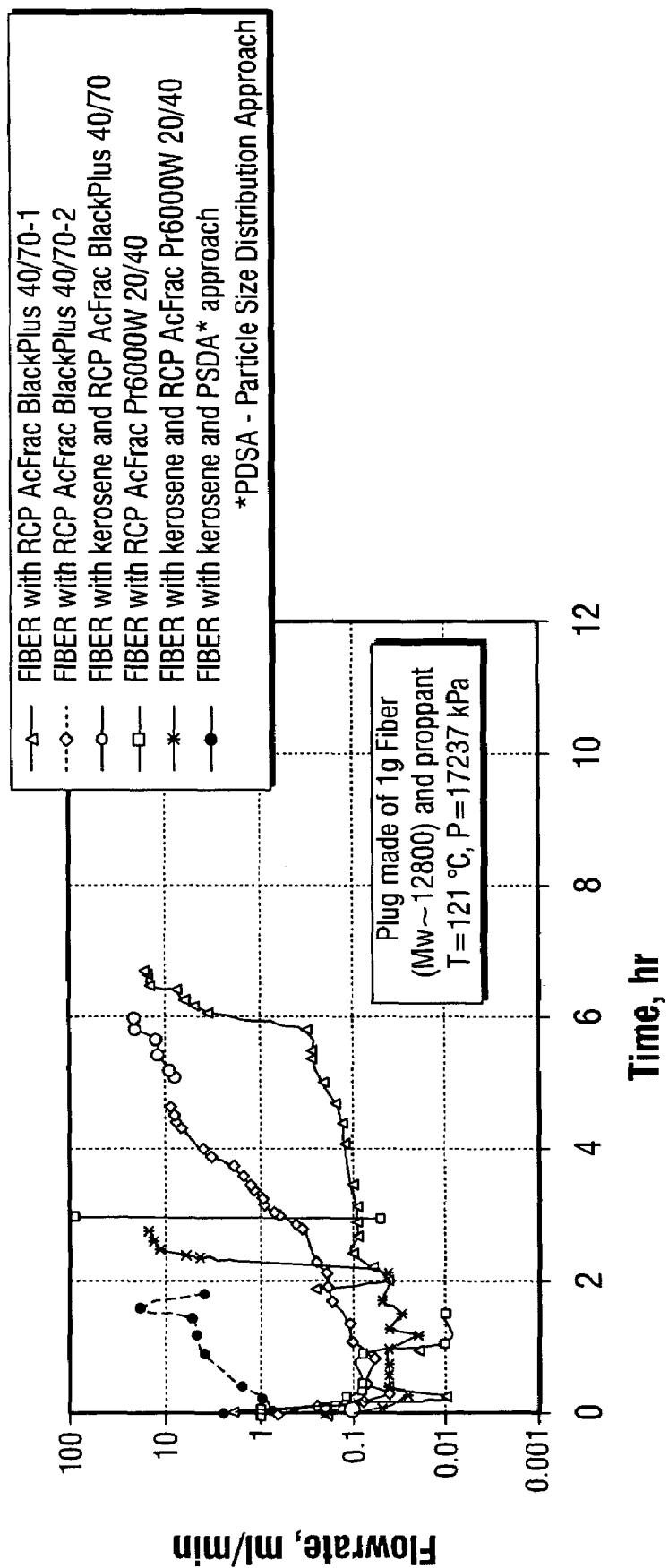
FIG. 5 shows a chart illustrating the decomposition of plugs made of polylactic acid having a molecular weight of ~128,000, as evidenced by a rapid increase of flow through the plugs, in the presence of kerosene, at 250° F. (121° C.) and at 1000 and 2500 psi (6.89 and 17.24 MPa), in accordance with one embodiment of the invention.

In addition to using higher molecular weight polymers, the lifetimes of plugs may also be increased by using delay agents that protect the polymers from degradation. For example, for PLA polymers, the main degradation mechanism is hydrolysis. By adding a hydrophobic agent to the polymer (or plug), for example as a coating, the rates of hydrolysis will be reduced. As a result, the lifetimes of the polymers (hence, the lifetimes of the plugs) will be increased, as shown in FIG. 5. Therefore, it is possible to control the lifetimes of plugs to suit the purposes of the operations.

Some embodiments of the invention use degradable fiber plugs as described above. Other embodiments of the invention use plugs that are formed of degradable fibers and another material, such as proppants, other particulates (such as sand), or degradable absorbents (such as polyacrylic acid—co-acrylamide). The inclusion of an absorbent material may help fill pores inside a plug and make it stronger. The use of appropriate RCP proppants or small grain size non-RCP proppants gives quite satisfactory results: RCP/fiber plugs are able to withstand a pressure differential of 2500 psi (17.2 MPa) at 250° F. (121° C.) for several hours, as shown in FIG. 5.

In accordance with some embodiments of the invention, degradable materials are used in combination with methods of increasing the solid content of a slurry using particle-size distribution technology. With a properly chosen multi-modal distribution of particle sizes, smaller particles fill the void spaces between larger ones, resulting in a slurry requiring less water. Typical distributions use two or three distinct particle size ranges. This provides a slurry with improved flow properties and excellent set properties such as permeability and strength. Thus, some embodiments of the invention use proppants of different sizes instead of RCP's. With these embodiments, the proppant compositions may be optimized to achieve sufficient conductivity of the plugs after the fibers are degraded.

With this approach (i.e., multi-modal particle size distribution), various combinations of temporary perforation sealers can be achieved with excellent properties. Because degradable or dissolvable materials, such as a polylactic acid fiber, may be selected to be compatible with formation fluids and their downhole lifetimes can be easily varied (e.g., by adding delay agents to increase their lifetimes), this approach is very attractive in the DMAD technique.

In designing multiple fracturing jobs, careful attention should be paid to the following items:

1) The chemicals (degradable materials) may be sensitive to the environment, so there may be dilution and precipitation issues. The sealer preferably should survive in the formation or wellbore for a sufficiently long duration (e.g., 3-6 hours). The duration should be long enough for: (a) wireline services to perforate the next pay sand; (b) subsequent fracturing treatment(s) to be completed; and (c) the fracture to close on the proppant before it completely settles, providing the best fracture conductivity. In tight gas formations with low leakoff, this may be an issue.

2) Degradable Material Sealers will allow no flowback. As a result, the fracture will be supercharged for a much longer period. This is good for diversion. However, in low leakoff formations, the shut-in time may become too long, which may result in proppant settling. In this case, flowback after the degradable materials is broken may be used to aid in suspending the proppant in the fracture.

Thus, a compromise between these two considerations should be made. In accordance with embodiments of the invention, the chemical lifetimes in the wellbore and the fracture preferably are not shorter than 2-3 hours. On the other hand, their lifetimes preferably do not exceed a certain limit to allow one to flow back formations with extremely low leakoff. This indicates that an appropriate selection of the sealer type and additives is important.

Consider the Degradable Material Sealer mechanisms in more detail. We assume that the first pay sand is fractured and has a temporary supercharge of $\Delta_1$ psi;

the sealing ability of the material is $p_{MS}$=1000 psi (6.9 MPa);

the induced stress is enough to divert the subsequent stage;

there is a normal stress increase with depth of 0.65 psi/ft (14.7 kPa/m);

fracturing fluid friction pressure is 500 psi/1000 ft (11.3 kPa/m); and the hydrostatic pressure difference is 500 psi (3.45 MPa).

With these assumptions the governing equation (4) can be rewritten as:

$$\Delta_2 + \Delta p_{HS} \leq \Delta_1 + \Delta p_{fr} + \Delta \sigma_{min} + p_{MS} \quad (6)$$

For stage spacing of 500 ft this will give $$\Delta_1 \geq \Delta_2 - 1325 \text{ psi (9.1 MPa)} \quad (7)$$

Taking into account that the sealer provides no flowback, i.e. most of supercharge $\Delta_1$ will stay in the first fracture, it becomes clear that the degradable material sealer may be an excellent diversion tool, providing excess pressure up to or higher than 2000 psi (13.8 MPa).

From the above description, it is apparent that good knowledge about formation and reservoir fluid properties is important to employ the Degradable Material Assisted Diversion (DMAD) techniques appropriately for multiple fracturing treatments. The following parameters are important ones to consider in optimizing a DMAD job: in-situ stress profile; in-situ stress differential between pay sand and shales; reservoir fluid composition and its compatibility with degradable material; and proppant sustaining in the fracture. Some of these parameters may be available from downhole measurements, while others may not be available. As noted above, embodiments of the invention may use a modeling technique to optimize the DMAD job. Any parameters not available may be optimized using a suitable modeling method known in the art.

As illustrated in the above description, embodiments of the invention use degradable materials to block a perforation, fracture, or wellbore temporarily so that work may be performed in other zones. In accordance with some embodiments of the invention, at the tail end of a fracturing treatment, a degradable material is pumped at a high concentration to temporarily plug a completed fracture, and to lock the proppant in a fracture making it immobile and causing substantial stress increase and diversion from lower zones by means of a significant net pressure increase due to a higher likelihood of proppant bridging. In accordance with some embodiments of the invention, a degradable material that can create a temporary packer is pumped after the proppant stages to temporarily seal the perforations associated with the fracture, or to temporarily seal the wellbore adjacent to these perforations. With this system, the fracture is protected and a subsequent fracturing treatment further up the hole may be performed without the need for wireline intervention.

Degradable materials will dissolve with time and unplug the fracture. The degradable materials may be of a variety of properties, shapes and compositions. The material decay or disintegration may be chemically, temperature or mechanically driven. Methods of the invention may be performed with any suitable equipment used in the industry, such as coiled tubing that is installed in the well ready to jet new perforations. While methods of the invention are conceptually similar to ISDT, the degradable material assisted diversion (DMAD) techniques of the invention guarantee much higher and more reliable stress diversion.

Figure 7A:
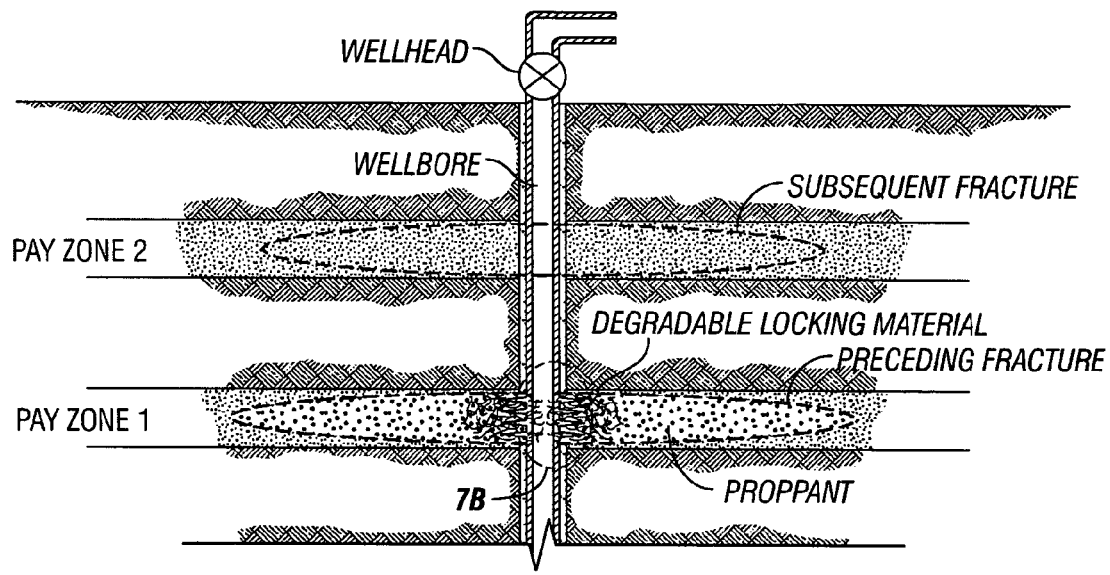
FIG. 7 shows a schematic illustrating the bridging and blocking of proppant in a fracture in accordance with one embodiment of the invention.
Figure 7B:
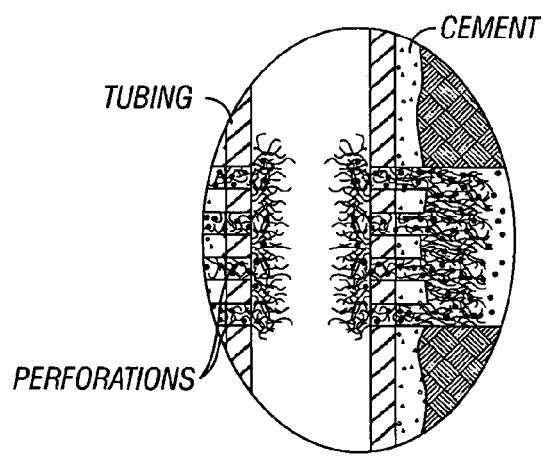

FIG. 7 shows a schematic representation of a method in accordance with some embodiments of the invention. In accordance with this method, a degradable material/chemical is added at the tail end of the proppant stages to induce proppant bridging. The addition of the material substantially increases the likelihood of proppant bridging in the fracture created in an earlier stage (shown as pay zone 1). Once proppant bridging occurs, proppants are locked in the fractures, which prevents flowback and helps retain the supercharge stress in pay zone 1 (shown as a dashed line pressure profile to the right). Proppant bridging may also induce a near-wellbore screen-out, which in turn can substantially increase the fracture supercharge in pay zone 1. The supercharge stress in pay zone 1 will divert the fracture fluids to the next pay zone to be fractured (shows as pay zone 2).

As noted above, the added degradable materials may have various shapes (e.g., particulates or fibers). The sizes of the additives preferably should be selected based on the fracture width; they should be less than the fracture openings so that they can enter the fractures. In addition, the degradable material should withstand formation conditions for a desired duration (such as 3-6 hours), i.e., the compatibility demands should be met.

Figure 6:
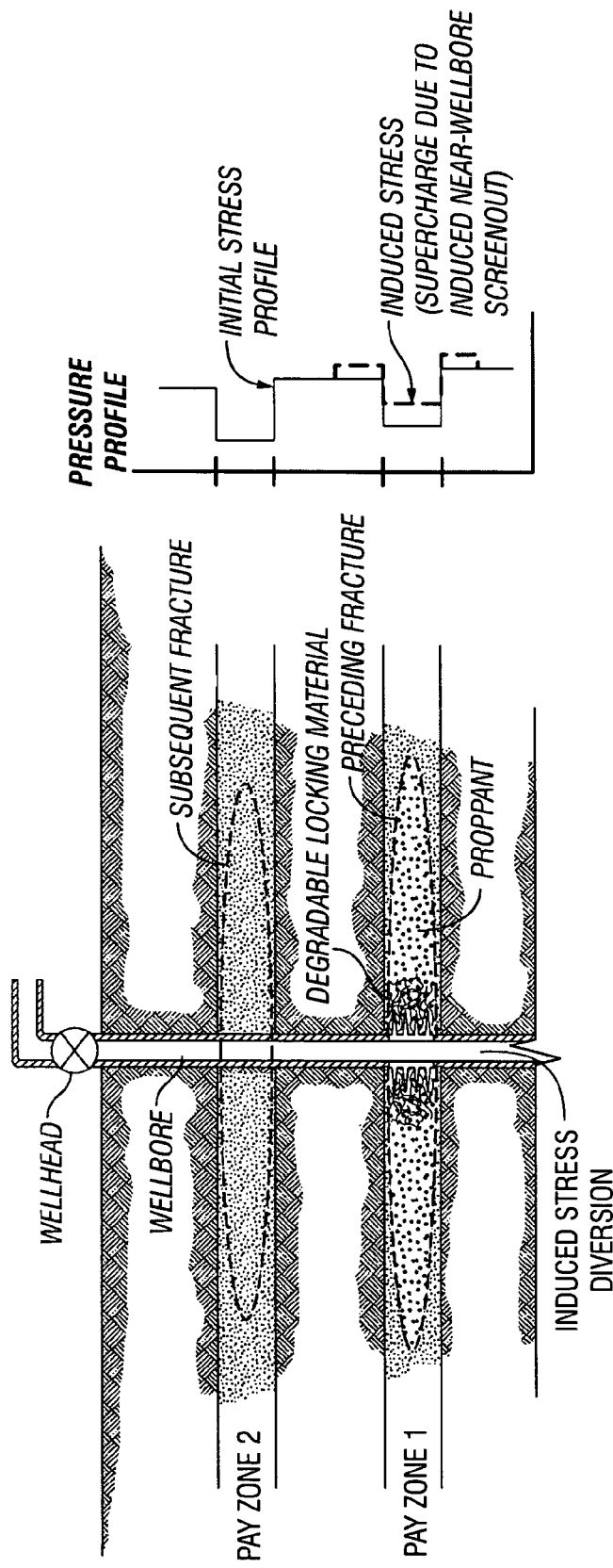
FIG. 6 shows a chart illustrating the decomposition of plugs made of degradable materials and proppant, as evidenced by a rapid increase of flow through the plugs, in the presence of kerosene at 250° F. (121° C.) and 2500 psi (17.24 MPa), in accordance with one embodiment of the invention.
Figure 8A:
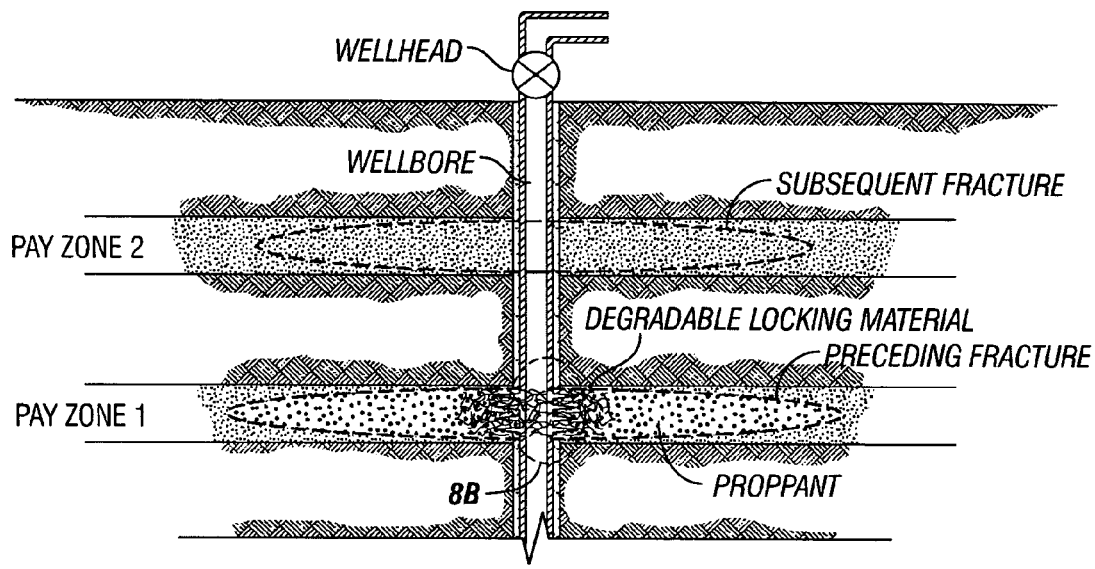
FIG. 8 shows a schematic illustrating plugging of a perforation in accordance with one embodiment of the invention.
Figure 8B:
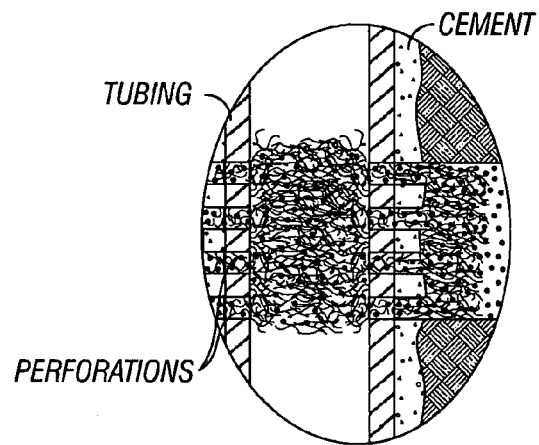

FIG. 8 shows another method in accordance with one embodiment of the invention. In this method, a degradable material is pumped at high concentration after the proppant stages. The chemical along with proppant clogs up the perforations, creating a temporary seal. As shown above, a temporary seal (or plug) formed of a degradable material may withstand over 2500 psi (17.2 MPa) pressure differential at 250° F. (121° C.) for several hours depending on the formation conditions (see FIGS. 4-6). In preferred embodiments, the seal or plug consists of one or more degradable materials only. However, since there exists a risk of over-pumping the proppant into the fracture, in some cases, it may be worthwhile to induce a tail screenout by adding a special chemical or material (a bridging inducing material, such as glass fibers) at the end of proppant stages. The sealing and bridging inducing materials may be different from the degradable materials. In accordance with these embodiments of the invention, both materials should be compatible with reservoir fluids for the desired durations.

Figure 9A:
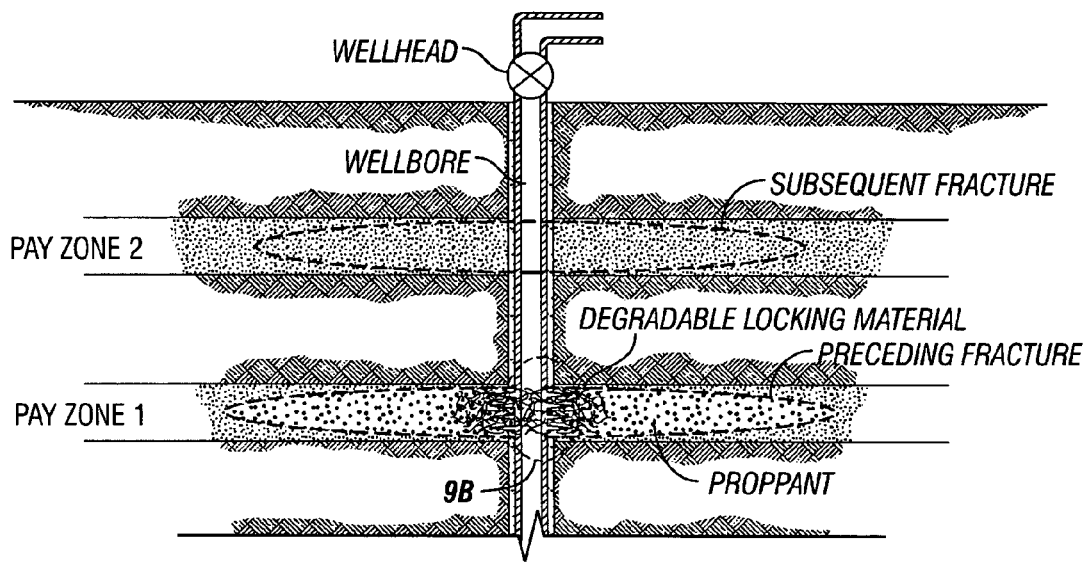
FIG. 9 shows a schematic illustrating plugging of a wellbore in accordance with one embodiment of the invention.
Figure 9B:
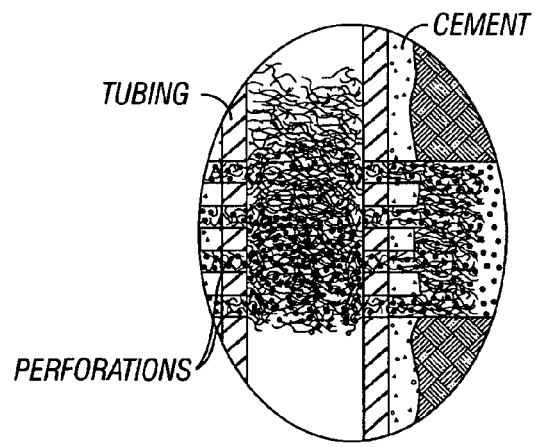

FIG. 9 shows another method in accordance with one embodiment of the invention. In accordance with this method, a temporary bridge plug may be formed in the wellbore. The temporary bridge is formed of a degradable material. This method extends the sealing to the wellbore in order to make sure that a preceding fracture is protected from re-fracturing (re-opening an existing fracture). Similar to the method depicted in FIG. 8, a tail screenout may be induced. Although there might exist a certain amount of sand in the perforations and wellbore, due to inducement of a tail screenout, the amount of sand in the wellbore will be much less than using the Sand Plug technique. In fact, all the combinations and permutations of partially or completely plugging wellbores, perforations, and fractures are embodiments of the invention.

FIG. 10 shows another method in accordance with one embodiment of the invention. In this method, a degradable material is pumped together with proppant at the tail end of a fracturing treatment to create a composite plug in the perforations and/or wellbore. No induced tail screenout is needed. In this case, the best stage diversion may be achieved. The degradable materials should be selected such that they will survive for several hours in the wellbore. A possible disadvantage of the embodiment is the sand production from the material in the wellbore during flowback when the sealing material is gone.

As noted above, methods of the invention that form temporary bridges or seals in the perforations, fracture(s), wellbore, or any combination of these are used for subsequent fracturing or for other operations to be performed downhole. In accordance with some embodiments of the invention, after the temporary seal is formed, the well may undergo various treatments instead of subsequent fracturing. For example, the wellbore may be repaired (acid treatments), or installation of an electric submersible pump (ESP) may be performed. The plugging agent can be selected to last sufficiently long to protect the formation over the expected time period of the subsequent downhole operation.

Therefore, in accordance with some embodiments of the invention, a fracture is temporarily sealed or blocked with a degradable material. The degradable material is used to temporarily protect the fracture from post-job workover fluid damage, or to temporarily protect downhole equipment from fracture flowback damage. The selection of the degradable materials depends on the expected damage, bottomhole conditions, and the durations needed for protection.

In accordance with embodiments of the invention, degradable materials are preferably compatible with different pH fracturing fluids and with brines containing different concentrations of salts (such as sodium chloride NaCl, calcium chloride $CaCl_2$, sodium bromide NaBr, potassium chloride KCl, and others). The degradable materials should be compatible with temperature ranges as wide as possible. It is preferred that the degradable materials are compatible with temperatures greater than 32° F. (0° C.). Degradable materials should be compatible with weighted brines or completion fluids as well.

In accordance with some embodiments of the invention, different types of chemicals may be pumped to accelerate or delay degradable material decomposition (see FIG. 5). Examples of delay agents may include any type of hydrophobic material (for example, kerosene, oil, diesel, polymers, surfactants, etc), which will cover the surfaces of the degradable materials to slow their interactions with water. For polyols, for example, such as partially hydrolyzed polyvinyl acetate, for example, salts may be included in the fluid; high ionic strength decreases the solubility of such materials. Examples of accelerator agents may include any high or low pH liquids (for example caustic or acid solutions), which will accelerate the decomposition of the degradable materials.

As noted above, methods of the invention for diversion or sealing of formation fractures using degradable materials may be based on results obtained from modeling. One of ordinary skill in the art would appreciate that various formation modeling techniques are available for hydraulic fracturing, such as Schlumberger's FracCADE stimulator™ and the methods disclosed in U.S. Pat. No. 6,876,959 issued to Pierce et al., which is assigned to the assignee of the present invention and is hereby incorporated by reference in its entirely. Other available software, for example, includes pseudo three-dimensional (P3D) hydraulic fracture simulators and planar three-dimensional (PL3D) hydraulic simulators (including GOHFER™ from Stim-Lab and Marathon Oil Co.). Embodiments of the invention are not limited to any particular modeling method.

In accordance with some embodiments of the invention, modeling is used to simulate induced stress diversion for the formation of interest. Then, the types and amounts of fluids to be used, and the durations and pumping rates for the fracturing job are accordingly selected.

Embodiments of the invention provide efficient methods for diverting stress/pressures for staged fracturing. One of ordinary skill in the art would appreciate that these methods may be applied in any type of well, including vertical, deviated or horizontal wells, and open or cased hole.

While the above description uses hydraulic fracturing to illustrate embodiments of the invention, one of ordinary skill in the art would appreciate that methods of the invention may also be used in other types of fracturing, including slickwater (or waterfrac) and acid fracturing. One of ordinary skill in the art would appreciate that various acid fracturing methods may be used with embodiments of the invention, including methods of generating acid downhole (using an emulsified acid, encapsulated acid, or solid acid precursor). For example, U.S. patent application Ser. No. 10/605,784 filed on Oct. 27, 2003, by Still et al. discloses the use of solid acid precursors to provide controlled release of acid by hydrolysis or dissolution. This application is assigned to the assignee of the present invention and is incorporated by reference in its entirety.

In accordance with one embodiment of the invention, the degradable materials may be used in acid fracturing. The degradable materials form temporary blocks in the high permeability zones to divert the acid frac to the zones in need of treatments. The acid fracturing may use a solid acid precursor, for example. The solid acid precursor may be lactide, glycolide, polylactic acid, polyglycolic acid, a copolymer of polyacetic acid and polyglycolic acid, a copolymer of glycolic acid with other hydroxyl-, carboxylic acid-, or hydroxycarboxylic acid-containing moieties, a copolymer of lactic acid with other hydroxyl-, carboxylic acid-, or hydroxycarboxylic acid-containing moieties, or mixture of the preceding. The solid acid may be mixed with a second solid that reacts with an acid to increase the rate of dissolution and hydrolysis of the solid acid precursor.

Furthermore, embodiments of the invention may also be used to temporarily plug the fractures or wellbore in order to achieve the desired effects or to perform other work. For example, methods of the invention may be used to temporarily shut in the well after fracturing so that the fractures can relax. For such a purpose, the duration is typically short, about 0.5 hour, for example. One can select a proper degradable material to achieve the desired duration. The degradable plugs in accordance with embodiments of the invention may also be used as "kill pills" to temporarily plug perforations or fractures.

The addition of the degradable materials in accordance with embodiments of the invention may be practiced with existing equipment. One of ordinary skill in the art would appreciate that various methods used in the field may be adapted for use with methods of the invention. For example, the degradable materials may be mixed with proppants in blenders. The addition of the chemicals (degradable materials or other additives) may be managed by means of a modified feeder or a flush kit. Alternatively, it is also possible to place the degradable materials by means of coiled tubing in the wellbore. Similarly, it is also possible to use coiled tubing for the injection (addition) of delay or accelerator agents. It is also possible to place the degradable materials via coiled tubing or tubing while simultaneously fracturing down the annulus between the coiled tubing and the casing. The degradable materials would mix with proppant or simply follow the proppant in the casing to cause the bridging.

The methods of the invention may also be combined with methods of using fibers to assist in the transport of proppant, for example in slickwater treatments, for example as described in U.S. patent application Ser. No. 11/156,966, entitled "Degradable Fiber Systems For Stimulation", filed Jun. 20, 2005, assigned to the same assignee as the present application, and hereby incorporated in its entirety. The methods may also be used in treatments in which fibers are also used in proppant-free fluids such as in the pads of fracturing treatments, or in prevention of fluid loss into natural fractures, for example as described in U.S. patent application Ser. No. 11/206,898, entitled "Methods For Controlling Fluid Loss," filed Aug. 18, 2005, assigned to the same assignee as the present application, and hereby incorporated in its entirety. Preferably, the same fiber is used in all stages of these combination treatments. As an example, the same degradable fiber is used in the pad of a fracturing treatment stage, and/or in the main fracturing fluid of the stage to assist proppant transport, and at the end of the stage for degradable material assisted diversion.

It should be noted that the pumping rate may be reduced at the end of a fracturing stage to promote screenout, for example of fibers and proppant in hydraulic fracturing or of fibers in acid fracturing. It should also be noted that the first fracture will be placed in the weakest part of the formation, which could be at the wellhead end, the far end, or anywhere in between, and the layers could be fractured in any sequence. If one or more plugs are in the wellbore rather than in the fractures, this would require removing one or more plugs during the treatment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of well treatment, comprising:
   a) injecting a slurry comprising a degradable fiber,
   b) allowing the degradable fiber to form a plug in one or more than one of a perforation, a fracture, and a wellbore in a well penetrating a formation;
   c) performing a downhole operation; and
   d) allowing the degradable fiber to at least partially degrade after a selected duration such that the plug disappears.

2. The method of claim 1, wherein the degradable fiber is selected from a polymer of lactide, glycolide, polylactic acid, polyglycolic acid, amide, and mixtures thereof.

3. The method of claim 1, wherein the degradable fiber is present at a concentration of no less than 40 lbm/1,000 gal (4.8 g/L).

4. The method of claim 1, wherein the operation is a fracturing operation and the method further comprises injecting a second material to induce a screenout during the fracturing operation.

5. The method of claim 1, wherein the slurry further comprises a particulate material.

6. The method of claim 5, wherein the particulate material is degradable.

7. The method of claim 5, wherein the particulate material is a proppant.

8. The method of claim 7, wherein the proppant comprises particles having a distribution of sizes.

9. The method of claim 1, wherein the slurry further comprises an additive for delaying degradation of the degradable fiber.

10. The method of claim 1, wherein the slurry further comprises an additive for accelerating degradation of the degradable fiber.

11. The method of claim 1, further comprising modeling to optimize parameters for the well treatment, wherein the step of injecting the slurry is based on the optimized parameters.

12. The method of claim 11, wherein the optimized parameters comprise the selected duration before the degradable fiber degrades.

13. The method of claim 1, wherein the well treatment comprises hydraulic fracturing.

14. The method of claim 13, wherein the hydraulic fracturing comprises injecting a pad, said pad comprising the degradable fiber.

15. The method of claim 14, wherein the step of injecting the slurry is performed at the tail end of fracturing a layer.

16. The method of claim 13, wherein hydraulic fracturing is applied to more than one layer of a multilayer formation.

17. The method of claim 16, wherein no bridge plug or sand plug is placed in the wellbore before fracturing a subsequent layer.

18. The method of claim 16, wherein the slurry further comprises a proppant, wherein the degradable fiber forms the plug in the fracture by bridging with the proppant when placed in the fracture.

19. The method of claim 1, wherein the well treatment comprises acid fracturing or waterfrac.

20. The method of claim 1, wherein the selected duration for the plug to disappear is between 0.5 and 6 hours.

21. The method of claim 1, wherein the step of injecting the slurry is via coiled tubing installed in the well.

22. The method of claim 1 wherein the degradable fiber comprises a polyvinyl ester.

23. The method of claim 1, wherein the treatment is used to isolate a region selected from the fracture, a production zone, and a part of the wellbore, wherein the part of the wellbore is above the formation pressure.

24. The method of claim 1, wherein the degradable fiber is selected from limestone fibers and glass fibers.

25. The method of claim 1, wherein the well treatment comprises chemical strimulation.

* * * * *